(12) United States Patent
Yoo et al.

(10) Patent No.: US 11,429,420 B2
(45) Date of Patent: Aug. 30, 2022

(54) METHOD FOR CONTROLLING PERFORMANCE IN VIRTUALIZED ENVIRONMENT AND INFORMATION PROCESSING DEVICE FOR THE SAME

(71) Applicant: Korea University Research and Business Foundation, Seoul (KR)

(72) Inventors: Hyuck Yoo, Seoul (KR); Kyoung Woon Lee, Seoul (KR); Soo-Wan Kim, Goyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 166 days.

(21) Appl. No.: 16/599,376

(22) Filed: Oct. 11, 2019

(65) Prior Publication Data

US 2020/0356398 A1 Nov. 12, 2020

(30) Foreign Application Priority Data

May 8, 2019 (KR) ........................ 10-2019-0053729

(51) Int. Cl.
*G06F 9/455* (2018.01)
*G06F 9/50* (2006.01)

(52) U.S. Cl.
CPC ........ *G06F 9/45558* (2013.01); *G06F 9/5027* (2013.01); *G06F 9/5077* (2013.01);
(Continued)

(58) Field of Classification Search
CPC .. G06F 9/45558; G06F 9/5077; G06F 9/5027; G06F 2009/45595; G06F 2009/45579; G06F 2009/45583
See application file for complete search history.

(56) References Cited

U.S. PATENT DOCUMENTS

| | | | |
|---|---|---|---|
| 2015/0312116 A1* | 10/2015 | Taheri | H04L 43/00 709/224 |
| 2017/0171302 A1* | 6/2017 | Seo | H04L 67/1097 |
| 2017/0277531 A1* | 9/2017 | McGrath | G06F 9/5083 |

FOREIGN PATENT DOCUMENTS

| | | |
|---|---|---|
| JP | 2018-36724 A | 3/2018 |
| KR | 10-1539496 B1 | 7/2015 |

(Continued)

OTHER PUBLICATIONS

Ko et al., "Analysis of Feedback Control CPU Scheduling in Virtualized Environment to Resolve Network I/O Performance Interference," KIISE Transactions on Computing Practices Vo. 23, No. 9, Sep. 2017, pp. 572-577.

*Primary Examiner* — Dong U Kim
(74) *Attorney, Agent, or Firm* — NSIP Law

(57) ABSTRACT

An information processing device for performing performance control in a virtualized environment is disclosed. The information processing device can include an I/O thread configured to transfer signals between a virtual machine and at least one physical resource, and a performance manager unit configured to compare a target performance for the virtual machine with an actual performance of the virtual machine and manage a resource allocated to the I/O thread based on the comparison result, where the performance manager unit may obtain information regarding the actual performance of the virtual machine, determine a performance adjustment value by using the difference between the actual performance of the virtual machine and the target performance for the virtual machine, and manage the resource allocated to the I/O thread based on the performance adjustment value.

15 Claims, 6 Drawing Sheets

(52) U.S. Cl.
CPC .............. *G06F 2009/45579* (2013.01); *G06F 2009/45583* (2013.01); *G06F 2009/45595* (2013.01)

(56) References Cited

FOREIGN PATENT DOCUMENTS

| | | | |
|---|---|---|---|
| KR | 10-1613513 | B1 | 4/2016 |
| KR | 10-1816718 | B1 | 2/2018 |

* cited by examiner

METHOD FOR CONTROLLING PERFORMANCE IN VIRTUALIZED ENVIRONMENT AND INFORMATION PROCESSING DEVICE FOR THE SAME

CROSS-REFERENCE TO RELATED APPLICATIONS

This application claims the benefit of Korean Patent Application No. 10-2019-0053729, filed with the Korean Intellectual Property Office on May 8, 2019, the disclosure of which is incorporated herein by reference in its entirety.

BACKGROUND

1. Technical Field

The present invention relates to a method for controlling performance in a virtualized environment and an information processing device for the same.

2. Description of the Related Art

A virtual machine (VM) refers to the implementation of a physical computing environment (e.g. a central processing unit, memory device, etc.) in a software form that operates similarly to a regular computing device. That is, a virtual machine may be operated by using the resources of a physical machine. An operating system (hereinafter referred to as a guest OS) can be installed on a virtual machine to efficiently manage the resources, software, etc., of the virtual machine. The guest OS can perform various operations, such as for providing an interface for certain resources, computing inputted data, generating control commands for a required operation, etc., in a manner similar to an operating system (hereinafter referred to as a host OS) installed directly on a physical machine.

A multiple number of virtual machines can be installed and established on a physical machine. The multiple virtual machines installed on one physical machine may be operated while sharing the resources of the physical machine. Virtualization refers to the technology for establishing and providing an environment that enables several virtual machines to share the resources of the physical machine while preventing a decrease in the resource utilization rate of the physical machine. Virtualization technology allows the user access to various computing platforms as well as various services that are based on such platforms.

In recent times, virtualization technology has been used to implement cloud computing. In particular, cloud computing can also be implemented by using server consolidation technology to virtualize and consolidate physical resources. With server consolidation, the virtual machines installed on physical server devices of relatively low use rate may be concentrated on a few other physical server devices to have several virtual machines operating on one physical machine. This makes it possible to increase the use rate of a particular physical server device and also stop the supply of power to other physical server devices that are not being used, thereby reducing the maintenance costs of the cloud data center overall. When a user uses a virtual machine established in this manner, the user may require a certain level of performance from the virtual machine according to the purpose, etc. The service provider for cloud computing may offer and guarantee the level requirements of the user through a SLA (service level agreement). However, such guarantee of performance is still not entirely fulfilled and as yet remains at a limited degree.

SUMMARY OF THE INVENTION

An objective of the invention is to provide a method for controlling performance in a virtualized environment and an information processing device for the same which can control and manage the performance of input and output between virtual machines and physical devices to prevent performance degradation caused by a competition for resources between the virtual machines.

To achieve the objective above, a method for controlling performance in a virtualized environment and an information processing device for the same are provided.

The information processing device can include a virtual machine, an I/O thread configured to transfer signals between the virtual machine and at least one physical resource, and a performance manager unit configured to compare a target performance for the virtual machine with an actual performance of the virtual machine and manage a resource allocated to the I/O thread based on the comparison result.

The performance control method for a virtualized environment can include obtaining a target performance for a virtual machine and an actual performance for the virtual machine and managing a resource allocated to an I/O thread based on the target performance and the actual performance, where the I/O thread can perform a transfer of signals between the virtual machine and at least one physical resource.

The method of controlling performance in a virtualized environment and the information processing device for the method described above can control and manage the performance of input and output between virtual machines and physical devices, such as a network device or a memory device for example, to prevent performance degradation caused by a competition for resources between the virtual machines.

Also, an embodiment of the invention allows a more efficient use of the resources of a processor such as a central processing unit, in effect enabling an additional supply of available resources for the processor.

Also, an embodiment of the invention enables a cloud computing service provider to adequately ensure a level of performance matching the requirements of the users.

Also, an embodiment of the invention can achieve an efficient operation and a stable performance of the virtual machines without having to additionally install or replace hardware equipment, thereby improving service quality and reducing costs.

Additional aspects and advantages of the present invention will be set forth in part in the description which follows, and in part will be obvious from the description, or may be learned by practice of the invention.

DETAILED DESCRIPTION OF THE INVENTION

Figure 1:
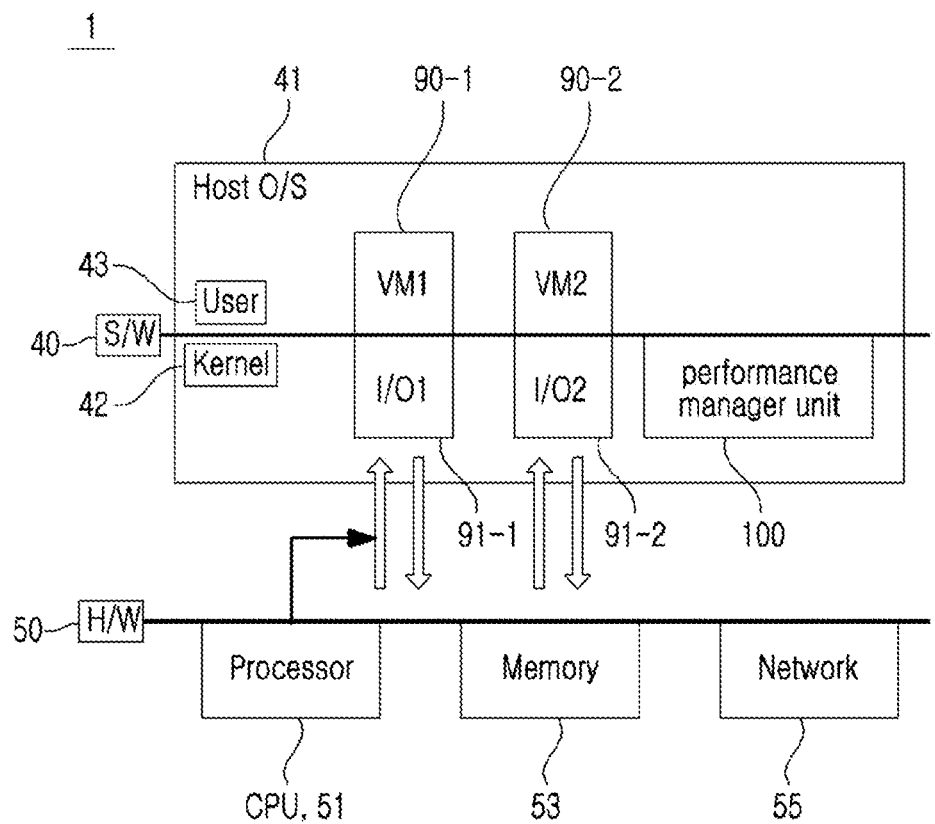
FIG. 1 is a diagram illustrating an embodiment of an information processing device.

In the following, the same reference numerals refer to the same elements overall unless under unique circumstances. Also, a term described as a 'unit' can be implemented as a software and/or hardware part, and it is possible for different embodiments to have a 'unit' implemented as a single software and/or hardware part or as a multiple number of software and/or hardware parts.

When one part is mentioned as being connected to another part, this can refer to the one part and the other part being connected physically or being connected electrically. Also, when one part is mentioned as including another part, this does not preclude the presence of parts other than the mentioned other part unless there is specific description to the contrary, and other parts can further be included according to the discretion of the designer.

Terms such as 'first', 'second', etc., are used to differentiate a part from another and do not represent a sequence unless there is specific description otherwise. Also, an expression in the singular can encompass an expression in the plural unless in the case of a clear exception in the context.

A description of an information processing device capable of performing performance control in a virtualized environment is provided below with reference to FIGS. 1 to 6.

FIG. 1 is a diagram illustrating an embodiment of an information processing device. Referring to FIG. 1, the information processing device 1 can include hardware 50 and software 40 that is operated based on the hardware 50.

The hardware 50 refers to a physical device that is mounted on the information processing device 1 to execute or support the operations of the information processing device 1 and can provide the resources necessary for the software 40 (for instance, the host OS 41, etc.) to allow the software 40 to execute a particular operation. The hardware 50 can include a processor 51, a memory device 53, a network device 55, etc.

The processor 51 can wholly or partially manage and control the information processing device 1 and can perform the processing, etc., required for operating the information processing device 1 or the software (programs, etc.) installed on the information processing device 1. The processor 51 can allocate and provide the resources needed for operating the host OS 41 and/or at least one virtual machine 90 (90-1, 90-2) installed on the host OS 41. Also, the processor 51 can allocate and provide the resources needed by at least one I/O thread 91 (91-1, 91-2) operating in the kernel area 42 of the host OS 41.

The processor 51 can include a central processing unit (CPU), a microcontroller unit (MCU), a micom (microprocessor), an application processor (AP), an electronic control unit (ECU) and/or other electronic devices, etc., capable of various processing and control signal generation. It is possible to implement these devices with one or multiple semiconductor chips and their related parts.

The memory device 53 can be provided to record and store data. The memory device 53 can also receive and record data from the processor 51, the operating system 41 and/or the programs or virtual machines 90 (90-1, 90-2) operated on the operating system 41 and provide the recorded data to these devices (41, 90, 51, etc.).

When the memory device 53 and the virtual machines 90 (90-1, 90-2) transmit and receive a request, a command (e.g. an I/O processing request, etc.), or data, the procedures can be performed by way of I/O threads 91 (91-1, 91-2) that correspond respectively to the virtual machines 90 (90-1, 90-2). That is, data from each virtual machine 90 (90-1, 90-2) can be transferred to the memory device 53 through an I/O thread 91 (91-1, 91-2). Thus, if a sufficient amount of resources (e.g. central processing unit resources) have not been allocated to the I/O threads 91 (91-1, 91-2), the exchange of data between the virtual machines 90 (90-1, 90-2) and the memory device 53 may be easily delayed, even when a sufficient amount of resources have been allocated to the virtual machines 90 (90-1, 90-2).

The memory device 53 can include at least one of a main memory device and an auxiliary memory device. The main memory device can be implemented by using ROM and/or RAM, where the ROM may include PROM, EPROM, EEPROM and/or MASK-ROM, etc., and the RAM may include DRAM and/or SRAM, etc. The auxiliary memory device can be implemented by using at least one storage medium capable of permanently or semi-permanently storing data, where some examples of such storage media may include a flash memory device, an SD (secure digital) card, a solid state drive (SSD), a hard disk drive (HDD), a magnetic drum, an optical medium such as a compact disk (CD), DVD, a laser disk, etc., a magnetic tape, a magneto-optical disk and a floppy disk.

The network device 55 can be provided to enable communication with another information processing device, an external memory device, and/or various other devices that can be connected directly or indirectly with the information processing device 1. The network device 55 can be implemented by way of an aggregation of certain parts such as a communication chip, a communication antenna, a communication terminal, and/or other communication parts (e.g. amplifier, etc.).

In one embodiment, the network device 55 can use the I/O threads 91 (91-1, 91-2) to exchange requests, commands (e.g. an I/O processing request, etc.), or data with the virtual machines 90 (90-1, 90-2) corresponding to the respective I/O threads 91 (91-1, 91-2). Thus, as described above, if resources have not been adequately allocated to the respective I/O threads 91 (91-1, 91-2), the processing of operations between the network device 55 and the virtual machines 90 (90-1, 90-2) may also easily be delayed.

The network device 55 can be connected to a wired communication network, a wireless communication network, or a combination thereof. Here, a wired communication network refers to a network established using cables, where the cables can include pair cables, coaxial cables, fiber optic cables, Ethernet cables, etc. A wireless communication network refers to a network established using at least one of a short-range communication network and a long-range communication network. The short-range communication network can include Wi-Fi, Wi-Fi Direct, Bluetooth, Bluetooth Low Energy, Zigbee, NFC (near-field communication) and/or CAN communication, etc. The long-range communication network can be one that is implemented based on a wired communication network standard, such as a mobile communication standard such as 3GPP, 3GPP2, or WiMAX, for example.

In addition, the information processing device 1 can also further include an input interface device such as a keyboard device, a mouse device, etc., or an output interface device such as a monitor device, a speaker device, etc.

The information processing device 1 described above can be implemented as at least one device that allows the installation of virtual machines 90-1, 90-2. For example, the information processing device 1 can include at least one of a desktop computer, a laptop computer, a server hardware device, a network-attached storage (NAS) device, a smart phone, a tablet PC, a head-mounted display (HMD) device, a smart clock, a digital television set, a set-top box, a navigation device, a personal digital assistant (PDA), a household appliance, a machine device, a robot, a vehicle control device, a portable game console, an electronic blackboard, an electronic billboard, a sound reproduction device, and/or another information processing device that allows the installation of virtual machines.

The software 40 can include an operating system 41 for performing the management, processing, and/or control, etc., of most of the processes executed by the information processing device 1. The operating system 41 can include Microsoft Windows, Mac OS, Linux, Unix, or various operating systems derived from Unix. At least one virtual machines 90 (90-1, 90-2) can be installed onto the operating system 41, and the operating system 41 in correspondence to the at least one virtual machines 90 (90-1, 90-2) can be referred to as a host operating system.

The host OS 41 can include a user area 43 and a kernel area 42. In the user area 43, various application programs (which can also be referred to as applications, apps, etc.) operable by the information processing device 1 can be executed. For example, each of the virtual machines 90 (90-1, 90-2) can be operated in the user area 43 to provide several services to the user.

A virtual machine 90 (90-1, 90-2) refers to software which in a virtual manner implements a physical device (for instance, the information processing device 1 itself or a physical part 51, 53, 55, etc., of the information processing device 1). Depending on a selection by the user or designer, a particular operating system (hereinafter referred to as a guest operating system) can be installed on a virtual machine 90 (90-1, 90-2). In this case, the guest operating system can be the same operating system as or a different operating system from the host OS 41. For example, the host OS 41 can be a Linux operating system, while the guest operating system can be a Microsoft Windows operating system. A single or a multiple number of virtual machines 90 (90-1, 90-2) can be installed on one host OS 41. In cases where there are multiple virtual machines 90 (90-1, 90-2) installed, each of the virtual machines 90 (90-1, 90-2) can operate as a physically separated device or operating system. In such cases, at least two of the multiple number of virtual machines 90 (90-1, 90-2) can be installed with the same operating system or can be installed with different operating systems.

According to one embodiment, the virtual machines 90 (90-1, 90-2) can include a KVM (Kernel-based virtual machine). A KVM is a Linux-based virtualization platform and can provide a virtualized environment in a kernel module form by using Linux as the host OS 41.

A kernel refers to the software that generally manages and controls the system of the information processing device 1. For example, a kernel may be designed to perform various operations associated with process management, resource management, security, etc. The kernel can include a monolithic kernel, a microkernel, a hybrid kernel, an exokernel, or a nanokernel, etc. In the kernel area 42 implemented by the kernel, at least one kernel thread can be operated. The kernel thread can include at least one I/O thread 91 (91-2, 91-2).

An I/O thread 91 (91-1, 91-2) can transfer a request or data, etc., generated by a virtual machine 90 (90-1, 90-2) to a physical device (51, 53, 55, etc.) or transfer a request or data, etc., from the physical device (51, 53, 55, etc.) to the virtual machine 90 (90-1, 90-2). An I/O thread 91 (91-1, 91-2) can be provided for each virtual machine 90 (90-1, 90-2) in correspondence to the virtual machine 90 (90-1, 90-2). For example, a first virtual machine 90-1 can be provided with a first I/O thread 91-1 to be in correspondence with each other, and a second virtual machine 90-2 can be provided with a second I/O thread 91-2 to be in correspondence with each other. Depending on the embodiment, it is possible to have one I/O thread 91 provided for multiple virtual machines 90, and it is also possible to have multiple I/O threads 91 provided for one virtual machine 90. While the I/O threads 91 (91-1, 91-2) can be operated under a kernel-based virtual machine environment as described above, the invention is not limited thus.

According to one embodiment, the information processing device 1 can include a performance manager unit 100. In addition, it is also possible for the information processing device 1 to further include a resource manager unit 60 (see FIG. 2) as necessary.

The performance manager unit 100 can be designed to manage the performance of a single or a multiple number of virtual machines 90 (90-1, 90-2) and/or perform various control operations required therefor. In cases where more than one virtual machines 90 (90-1, 90-2) are installed on the host OS 41, the performance manager unit 100 can also manage and control each of the multiple number of virtual machines 90 (90-1, 90-2). As illustrated in FIG. 1, the performance manager unit 100 can operate in the kernel area 42 and, for example, can be a kernel module operating in a virtualized environment. A kernel module can refer to a code (program) that is loaded or unloaded to the kernel area 42 when necessary to be executed and terminated in the kernel area 42. Depending on the embodiment, it is possible to have the performance manager unit 100 designed for operation in an area other than the kernel area 42. For example, the performance manager unit 100 can be designed to perform a particular operation in the user area 43 or can also be embedded in a particular processor 51 beforehand and designed to perform a particular operation thus.

According to one embodiment, the performance manager unit 100 can manage the degree or proportion in which the I/O threads 91 (91-1, 91-2) occupy resources (as expressed in terms of the use amount, occupation amount, occupation rate, etc.). For example, the performance manager unit 100 can distribute and allocate the resources of the processor 51 (e.g. CPU) provided to the I/O threads 91 (91-1, 91-2) to manage, adjust, or control the use amount of each of the at least one I/O threads 91 (91-1, 91-2) with respect to the resources of the processor 51. This enables a scheduling processing for managing the use amount of the resources by the I/O threads 91 (91-1, 91-2). The use amount of the resources of the processor 51 can also be expressed in terms of the bandwidth, etc., of the central processing unit. Here, the bandwidth of the central processing unit may be a value representing the use amount of the resources provided by the central processing unit and can be expressed as a percentage, and when a physical core is being used completely, the bandwidth of the central processing unit can be expressed as 100%.

The performance manager unit 100 can be one that is provided to operate in a kernel-based virtual machine environment. In such a case, when the performance manager unit 100 is not operated, the information processing device 1 may operate in the same manner as for a typical kernel-based virtual machine environment, and conversely when the performance manager unit 100 is operated, the performance of the I/O threads 91 (91-1, 91-2) in the kernel-based virtual machine environment can be controlled, so that the I/O performance of a physical device, such as the memory device 53 or network device 55 for example, can be managed and controlled.

The performance manager unit 100 can also be implemented in the form of an application. In this case, the performance manager unit 100 can be an application installed directly in the kernel area 42 by a designer, etc., or can also be an application obtained through an electronic software distribution network that can be accessed over a wired or wireless communication network.

Figure 2:
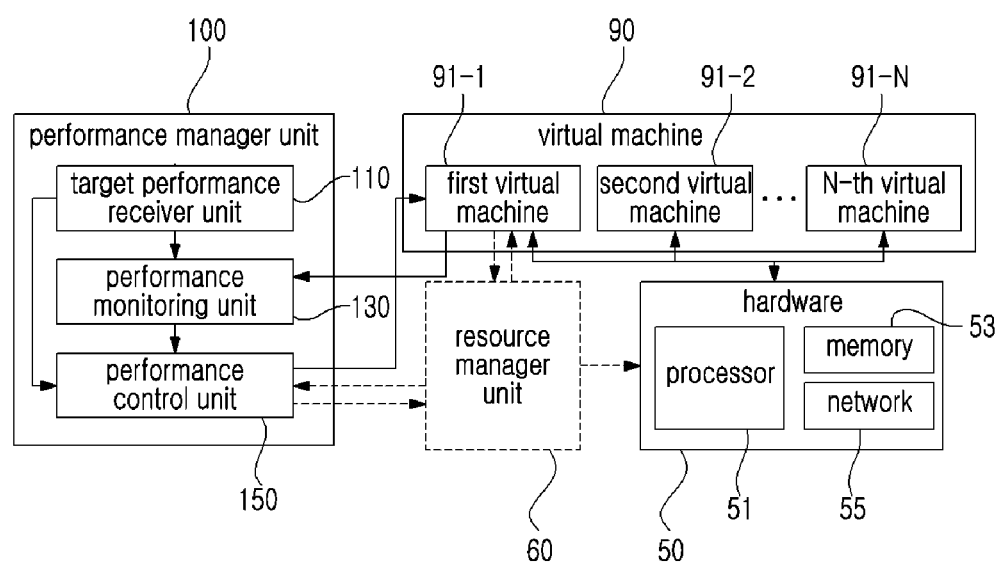
FIG. 2 is a block diagram illustrating an embodiment of the performance manager unit shown in FIG. 1.
Figure 3:
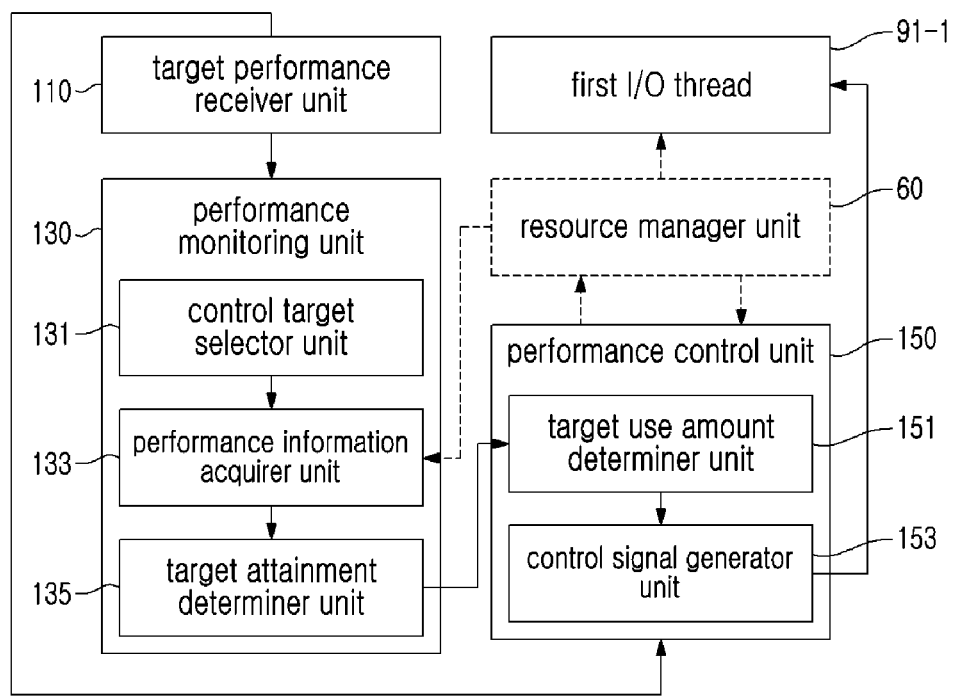
FIG. 3 is a block diagram illustrating an embodiment of the performance monitoring unit and the performance control unit shown in FIG. 2.

FIG. 2 is a block diagram illustrating an embodiment of the performance manager unit shown in FIG. 1, and FIG. 3 is a block diagram illustrating an embodiment of the performance monitoring unit and the performance control unit shown in FIG. 2.

According to the embodiment illustrated in FIG. 2, the performance manager unit 100 can include a target performance receiver unit 110, a performance monitoring unit 130, and a performance control unit 150.

The target performance receiver unit 110 can receive and set the performance levels required for each of the virtual machines 90-1 to 90-N (where N is a natural number of 1 or higher), the performance levels required for a particular resource of each of the virtual machines 90-1 to 90-N, and/or the performance levels required by each of the virtual machines 90-1 to 90-N (hereinafter referred to as target performance). Here, the performance levels required for a particular resource of the virtual machines 90-1 to 90-N can include the I/O performance with respect to the memory device 53 and/or the I/O performance with respect to the network device 55. In such cases, the target performance for the I/O of the memory device 53 can be inputted using a bandwidth (MB/s), and the target performance for the I/O of the network device 55 can be inputted using a number of packets processed per second or bandwidth (Mbps), etc.

The target performance receiver unit 110 can receive input of the target performance from an input interface (not shown) or from the processor 51, etc. For example, an input interface can output electrical signals according to a user's manipulation, and the target performance receiver unit 110 can receive the target performance by receiving the electrical signals outputted from the input interface or data corresponding to the electrical signals. The target performance receiver unit 110 can transfer the received target performance to the performance control unit 150.

The performance monitoring unit 130 can also collect information regarding the virtual machines 90-1 to 90-N or regarding the I/O threads 91-1 to 91-N corresponding respectively to the virtual machines 90-1 to 90-N. For example, the performance monitoring unit 130 can collect and obtain information regarding the amount of resources actually being used by the virtual machines 90-1 to 90-N or the I/O threads 91-1 to 91-N (i.e. actual resource use amount) to monitor the operations of the virtual machines 90-1 to 90-N and I/O threads 91-1 to 91-N.

Furthermore, the performance monitoring unit 130 can also determine the actual performance of the virtual machines 90-1 to 90-N or I/O threads 91-1 to 91-N (i.e. current performance) and, based on the actual performance thus determined, can determine whether or not a performance control is needed. To this end, the performance monitoring unit 130 can also obtain performance information regarding the virtual machines 90-1 to 90-N or I/O threads 91-1 to 91-N based on the collected information.

According to one embodiment, the performance monitoring unit 130 can, as illustrated in FIG. 3, include a control target selector unit 131, a performance information acquirer unit 133, and a target attainment determiner unit 135 for deciding the actual performance and determining whether or not control is needed.

The control target selector unit 131 can select at least one I/O thread that is to be controlled, for instance the first I/O thread 91-1, from among the multiple number of I/O threads 91-1 to 91-N corresponding respectively to the multiple number of virtual machines 90-1 to 90-N. Depending on the embodiment, if there are multiple I/O threads 91-1 to 91-N, the control target selector unit 131 can select all of the multiple I/O threads 91-1 to 91-N such that each becomes a control target, or can select only a portion of the I/O threads 91-1 to 91-N to be the control target or targets. Also, the control target selector unit 131 can sequentially or arbitrarily select all of or a portion of the multiple I/O threads 91-1 to 91-N as the control target.

The performance information acquirer unit 133 can obtain the information needed for computing the performance of the virtual machines 90-1 to 90-N or I/O threads 91-1 to 91-N and can also determine the actual performance of the virtual machines 90-1 to 90-N or I/O threads 91-1 to 91-N based on the information. In this case, the performance information acquirer unit 133 can collect the needed information regarding the first I/O thread 91-1 selected by the control target selector unit 131 described above or regarding the virtual machine corresponding to the first I/O thread 91-1, i.e. the first virtual machine 90-1 or can determine the actual performance thereof. Here, the information needed for the performance computation can include the bandwidth or the number of packets per second during an actual I/O operation of the network device 55 or the bandwidth during the I/O operation of the memory device 53, etc. The performance information acquirer unit 133 can also calculate the real-time resource use amount and actual performance by using a particular set of statistics information for the device and/or a resource manager unit 60 provided separately for acquiring the performance information.

The target attainment determiner unit 135 can receive the target performance from the target performance receiver unit 110 and can compare the actual performance obtained by the performance information acquirer unit 133 with the target performance to determine whether or not the target has been attained. To provide a more specific example, the target attainment determiner unit 135 can compute the difference between the actual performance and the target performance and can determine that the target has been attained if the difference between the actual performance and the target performance is the same as or within a certain range (e.g. an error range) of a pre-defined value. Here, the pre-defined value can include 0. In other words, the target attainment determiner unit 135 can determine that the virtual machines 90-1 to 90-N or the I/O threads 91-1 to 91-N have reached the target performance if the difference between the target performance and the actual performance is 0 (or, the target performance and the actual performance are equal) or is a value within a pre-defined range with respect to 0 (i.e. target performance—actual performance=0 or 0+a, a being an arbitrary real number). Here, the value within a pre-defined range can include a value approximating 0. Conversely, if the difference between the actual performance and the target performance is not 0 or exceeds a pre-defined range (i.e. target performance—actual performance≠0 or 0+a), then the target attainment determiner unit 135 can determine that the target has not been attained.

The determination result of the performance monitoring unit 130 can be transferred to the performance control unit 150 and, as necessary, the information acquired by the performance monitoring unit 130 can also be transferred to the performance control unit 150. For example, if it is determined that the target has not been attained, then the target attainment determiner unit 135 can transfer the determination result stating that the target was not attained to the performance control unit 150 and, together with the determination result, can also transfer information on the target performance, actual performance, and actual resource use amount to the performance control unit 150. As needed, the difference between the target performance and the actual performance computed by the target attainment determiner unit 135 can be transferred to the performance control unit 150 as well. Conversely, if it is determined that the target has been attained, then the target attainment determiner unit 135 may not transfer any determination result to the performance control unit 150, or in different embodiments, can transmit information regarding the target attainment to the performance control unit 150.

The collecting of actual resource use amount or the obtaining of actual performance by the performance monitoring unit 130 can either be performed periodically or non-periodically. For example, the performance monitoring unit 130 can collect the resource use amount of at least one I/O thread 91-1 to 91-N, for example a selected first I/O thread 91-1, in a pre-defined period (e.g. every 1 second). Here, the resource use amount of the first I/O thread 91-1 can include at least one of a use amount of the first I/O thread 91-1 with respect to the processor 51 for performing communication with the memory device 53 and a resource use amount of the first I/O thread 91-1 with respect to the processor 51 for performing communication with the network device 55.

The performance control unit 150 can decide a performance adjustment value for each of the virtual machines 90-1 to 90-N or I/O threads 91-1 to 91-N, based on the actual performance derived by the performance monitoring unit 130 and the target attainment determination result, and can provide control based on the performance adjustment value such that the actual use amount of the I/O threads 91-1 to 91-N becomes equal to or approximates the target use amount.

According to one embodiment, the performance control unit 150 can include a target use amount determiner unit 151 and a control signal generator unit 153.

The target use amount determiner unit 151 can perform a resource scheduling adjustment by determining the target use amount in response to receiving a signal from the performance monitoring unit 130. In other words, if the actual performance of a first I/O thread selected as the control target or the actual performance of the corresponding first virtual machine 90-1 does not meet the target performance required by the user, etc., the target use amount determiner unit 151 can determine a target use amount of the first thread 91-1 with respect to a particular resource such that the first I/O thread 91-1 or the first virtual machine 90-1 can attain the target performance. In this case, the target use amount determiner unit 151 can determine the target use amount of the first thread 91-1 based on the actual performance, target performance, and actual use amount.

To provide a more specific example, the target use amount determiner unit 151 can determine the target use amount (i.e. use amount of a resource) based on Equation 1 and Equation 2 shown below.

$$C_{i+1} = C_i + k \cdot \frac{P_g - P_r}{P_g} \qquad \text{[Equation 1]}$$

Here, $C_i$ can refer to the actual use amount of a resource (e.g. central processing unit) at a particular time point i, and $C_{i+1}$ can refer to the target use amount for the resource at the next time point (i+1). Also, k may be a value for adjusting the degree of change of the target use amount (hereinafter referred to as the adjustment constant) and may have the value of any real number between 0 and 1. If the adjustment constant k is relatively close to 0, then the target use amount may be more finely adjusted, whereas if the adjustment constant k is close to 1, then the target use amount may be adjusted by a larger extent. The adjustment constant k can be given as 0.1, but this is merely an example, and the adjustment constant k can be defined in various ways according to the discretion of the designer or user. $P_g$ represents the target performance in a numerical form, and $P_r$ represents the actual performance in a numerical form. The target performance $P_g$ can be one that is obtained by the target performance receiver unit 110, and the actual performance $P_r$ can be one that is obtained by the performance information acquirer unit 133. The term $$\frac{P_g - P_r}{P_g}$$

on the right side of Equation 1 can represent a performance adjustment value.

Equation 1 above can be rewritten as Equation 2 shown below.

$$Q_{i+1} = Q_i + F \cdot k \cdot \frac{P_g - P_r}{P_g} \qquad \text{[Equation 2]}$$

Equation 2 has the performance adjustment value for attaining the target performance converted into CPU bandwidth parameters. Here, $Q_i$ represents the available time of a resource (e.g. central processing unit) at a particular time point i, $Q_{i+1}$ represents the available time of the resource at the next time point (i+1), and F represents period (µs). For example, if the available time $Q_i$ of the resource is 10,000 µs and the period F is 100,000 µs, then the bandwidth of the resource allocated to the selected I/O thread 91-1 may be determined as 10% (=10,000/100,000*100).

The target use amount determiner unit 151 can obtain the performance adjustment value by dividing the difference between the target performance $P_g$ and the actual performance $P_r$ at a particular time point i by the target performance, as shown in Equation 1 and Equation 2, and can determine the target use amount (Ci+1) for the selected target (i.e. the first I/O thread 91-1) by adding the performance adjustment value to the actual use amount $C_i$ at a particular time point i. In this case, the target use amount determiner unit 151 can also obtain the performance adjustment value by further applying the adjustment constant k to the value resulting from dividing the difference between the target performance and the actual performance by the target performance and can then add the performance adjustment value thus obtained to the actual use amount $C_i$ to compute the target use amount $(C_{i+1})$ for the next time point (i+1).

When determining the target use amount $(C_{1+1})$ as described above, if the collected actual performance $P_r$ is lower than the target performance $P_g$ (i.e. $P_r<P_g$), then the performance adjustment value would have a positive (+) value, and the target use amount $(C_{i+1})$ for the selected first I/O thread 91-1 may be determined to be higher than the actual use amount $C_i$. In other words, it may be determined that the resource use amount of the first I/O thread 91-1 is to be increased. Conversely, if the collected actual performance $P_r$ is higher than the target performance $P_g$ (i.e. $P_r>P_g$), then the performance adjustment value described above would have a negative (−) value, and as a result, the target use amount $(C_{i+1})$ for the selected first I/O thread 91-1 may be determined to be lower than the actual use amount $C_i$. In other words, it may be determined that the resource use amount of the first I/O thread 91-1 is to be decreased.

Depending on the embodiment, the target use amount determiner unit 151 can also obtain the performance adjustment value by computing an absolute value of the difference between the target performance $P_g$ and the actual performance $P_r$ at a particular time point i and dividing the absolute value by the target performance. In this case, the target use amount determiner unit 151 can first compare the sizes of the actual performance $P_r$ and the target performance $P_g$, and if the actual performance $P_r$ is lower than the target performance $P_g$ (i.e. $P_r<P_g$), can compute the target use amount $(C_{i+1})$ by adding the performance adjustment value to the actual use amount $C_i$, or conversely if the actual performance $P_r$ is higher than the target performance $P_g$ (i.e. $P_r>P_g$), can compute the target use amount $(C_{i+1})$ by subtracting the performance adjustment value from the actual use amount $C_i$.

The determination result of the target use amount determiner unit 151 can be transferred to the control signal generator unit 153. The control signal generator unit 153 can generate a control signal for increasing or decreasing the use amount in correspondence to the determination result of the target use amount determiner unit 151 and, based on this, can control the use amount of the resource for the selected I/O thread, i.e. the first I/O thread 91-1. That is, the resource allocated to the first I/O thread 91-1 may be changed according to the operation of the control signal generator unit 153. The control signal may be transferred to the processor 51 or the virtual machine 90-1 to 90-N, etc., and as a result, the resource use amount of the I/O thread 91-1 may be increased or decreased. According to one embodiment, the control signal generator unit 153 can also control the resource use amount of the first I/O thread 91-1 by using a resource manager unit 60. In this case, the control signal can be transferred to the resource manager unit 60, in response to which the resource manager unit 60 can control the resource allocated to the first I/O thread 91-1.

The resource manager unit 60 can provide the information needed for determining the performance information or resource use amount to the performance monitoring unit 130 and/or control the resources allocated to the virtual machines 90-1 to 90-N or their corresponding I/O threads 91-1 to 91-N according to the control of the performance control unit 150. The resource manager unit 60 can be provided to limit or isolate the use of resources by processes or threads and can also be implemented as a kernel module that operated in the kernel area 42. According to one embodiment, the resource manager unit 60 can be implemented by using a control group (cGroup) provided by a Linux operating system, etc., but the invention is not limited thus.

The operation of the performance manager unit 100 described above can be performed for a multiple number of virtual machines 90-1 to 90-N or a multiple number of I/O threads 91-1 to 91-N corresponding respectively to the multiple virtual machines 90-1 to 90-N, can be performed sequentially or arbitrarily to all of the multiple virtual machines 90-1 to 90-N or all of the multiple I/O threads 91-1 to 91-N, and can be performed sequentially or arbitrarily to a portion of the multiple virtual machines 90-1 to 90-N or a portion of the multiple I/O threads 91-1 to 91-N. Also, the operation of the performance manager unit 100 described above can be performed repeatedly either periodically or non-periodically. For example, the first virtual machine 90-1 and/or the first I/O thread 91-1 can have its or their performance monitored either periodically or non-periodically, and its or their resource use amount can be changed as necessary.

As described above, if, during the performing of various tasks by the virtual machines 90 (90-1 to 90-N), the actual performance does not meet the target performance, then the resources (e.g. the bandwidth of the central processing unit) provided to the I/O threads 91 (91-1 to 91-N) of the respective virtual machines 90 (90-1 to 90-N) can be adjusted, to thereby allow a speedier and easier attainment of the performance required by the user, etc. This procedure of adjusting resource allocation through feedback control can be performed in real time without prior profiling, so that the overhead for prior profiling can be minimized.

In the following, the performance of the information processing device 1 when the performance manager unit 100 described above is not operated is compared with the performance of the information processing device 1 when the performance manager unit 100 is operated, to provide a more detailed description of the advantageous effects of the performance manager unit 100.

Figure 4:
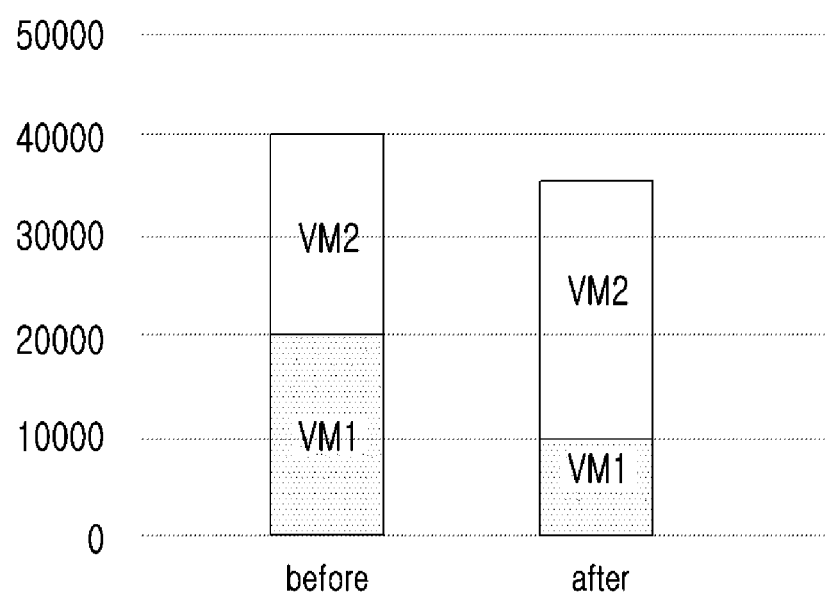
FIG. 4 is a first diagram illustrating the operation before and after applying the performance manager unit shown in FIG. 1.

FIG. 4 is a first diagram illustrating the operation before and after applying the performance manager unit shown in FIG. 1. FIG. 4 illustrates the measurement results of throughput in an environment where the performance manager unit 100 is not operated and in an environment where the performance manager unit 100 is operated when a first virtual machine VM1 and a second virtual machine VM2 are made to perform network tasks (continuously transmitting 1024B TCP packets). The y axis of FIG. 4 represents the throughput (unit: pps), and the x axis represents the cases where the performance manager unit 100 is not operated and is operated, in said order from the left.

Referring to FIG. 4, when the performance manager unit 100 is not operated, the first virtual machine VM1 and the second virtual machine VM2 both operated at a performance of roughly 20,000 pps. In contrast, when the performance manager unit 100 is operated with the target performance for the first virtual machine VM1 set to 10,000 pps and the target performance for the second virtual machine VM2 set to 25,000 pps, the first virtual machine VM1 and second virtual machine VM2 operate at differentiated performance levels according to the set target performances. Specifically, the first virtual machine VM1 operates at a lower performance (10,000 pps) in correspondence to the target performance that is lower than the actual performance, and the second virtual machine VM2 operates at a higher performance (25,000 pps) in correspondence to the target performance that is higher than the actual performance.

Figure 5:
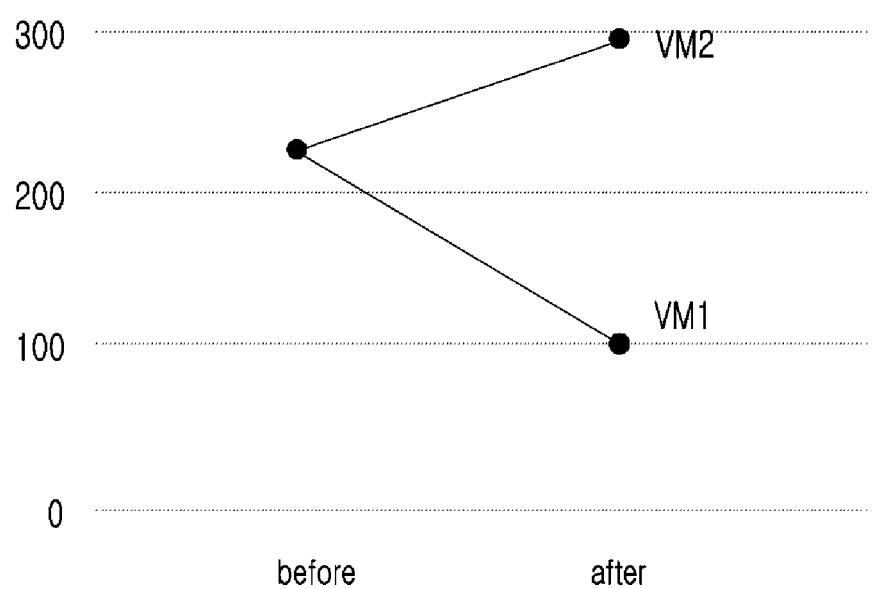
FIG. 5 is a second diagram illustrating the operation before and after applying the performance manager unit shown in FIG. 1.

FIG. 5 is a second diagram illustrating the operation before and after applying the performance manager unit shown in FIG. 1. FIG. 5 illustrates the measurement results of bandwidth in an environment where the performance manager unit 100 is not operated and in an environment where the performance manager unit 100 is operated when a first virtual machine VM1 and a second virtual machine VM2 are made to randomly perform tasks of writing and reading 16 kB files to and from the storage device (disk tasks). The y axis of FIG. 5 represents the bandwidth (unit: MBps), and the x axis represents the cases where the performance manager unit 100 is not operated and is operated, in said order from the left.

Referring to FIG. 5, when the performance manager unit 100 is not operated, the first virtual machine VM1 and the second virtual machine VM2 both operated at the same performance (roughly 220 MBps), but when the performance manager unit 100 is operated with the target performance for the first virtual machine VM1 set to 100 MBps and the target performance for the second virtual machine VM2 set to 300 MBps, it can be seen that the first virtual machine VM1 and second virtual machine VM2 operate differently according to the set target performances. Specifically, the first virtual machine VM1 operates at a performance (100 MBps) corresponding to the target performance that is relatively lower than the actual performance, and the second virtual machine VM2 operates at a performance (300 MBps) corresponding to the target performance that is relatively higher than the actual performance.

As illustrated in FIG. 4 and FIG. 5, the operation of the performance manager unit 100 as well as the differentiated settings of target performance cause the virtual machines VM1, VM2 to operate differently, as a result of which an adequate distribution of resources for the virtual machines VM1, VM2 becomes possible.

In the following, an embodiment of a performance control method for a virtualized environment is described with reference to FIG. 6.

Figure 6:
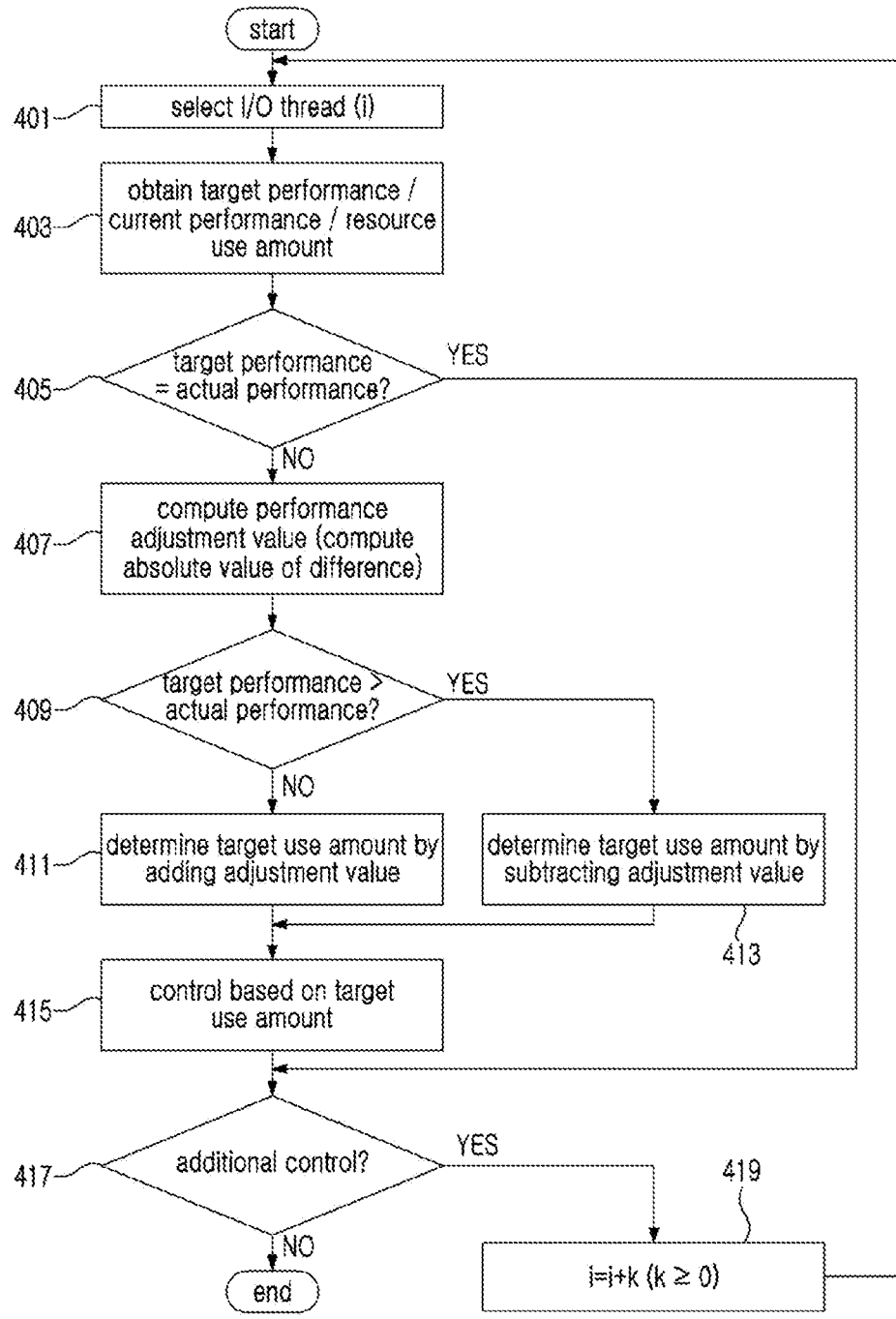
FIG. 6 is a flow diagram illustrating a method for controlling performance performed by the information processing device shown in FIG. 1 in a virtualized environment.

FIG. 6 is a flow diagram illustrating a method for controlling performance performed by the information processing device shown in FIG. 1 in a virtualized environment.

As shown in FIG. 6, first, an I/O thread can be selected as the control target (401). In this case, the selected I/O thread can be any one I/O thread from a multiple number of I/O threads and for instance can be the i-th I/O thread (where i is a natural number of 1 or higher).

The actual performance for the I/O thread selected as the control target or for the virtual machine corresponding to the I/O thread and the resource use amount of the I/O thread or virtual machine can be obtained (403). Furthermore, a target performance can also be obtained, before, after, or concurrently with the obtaining of the actual performance and use amount. The target performance can be inputted by the user, defined beforehand by the designer, or determined separately by way of an information processing device.

The target performance and the actual performance can be compared sequentially (405). If the target performance and the actual performance are the same (YES at 405), then the procedures from the adjustment value computation up to the target use amount-based control (407 to 415) described below can be bypassed.

Depending on the embodiment, even when the difference between the target performance and the actual performance falls within a certain value (e.g. an error range, etc.), it may be determined that the performance levels are substantially the same. In such a case, the procedures from the adjustment value computation up to the target use amount-based control (407 to 415) described below can be bypassed.

If the target performance and the actual performance are different (NO at 405), then a performance adjustment value can be computed in response (407). As disclosed in Equation 1 and Equation 2 presented above, the performance adjustment value can be obtained by dividing the difference between the target performance and the actual performance by the target performance or can obtained by multiplying an adjustment constant to the value obtained above. Here, the performance adjustment value can have a positive value or a negative value depending on the target performance and the actual performance. If the target performance is greater than the actual performance, then the performance adjustment value can have a positive value, and conversely if the actual performance is greater than the target performance, then the performance adjustment value can have a negative value. The performance adjustment value thus provided can be added to the actual use amount, as a result of which the target use amount can be obtained.

According to one embodiment, the performance adjustment value can also be obtained by dividing an absolute value of the difference between the target performance and the actual performance by the target performance or taking the absolute value of the result of dividing the difference between the target performance and the actual performance by the target performance. In this case, the target performance and the actual performance can first be compared to each other (409).

If the target performance is greater than the actual performance (YES at 409), then the target use amount can be determined by adding the performance adjustment value to the actual use amount (411). Conversely, if the target performance is smaller than the actual performance (NO at 409), then the target use amount can be determined by subtracting the performance adjustment value to the actual use amount (413).

Regardless of which procedure is used, cases where the target performance is greater than the actual performance will have the target use amount determined to be greater than the actual use amount, and conversely, cases where the target performance is smaller than the actual performance will have the target use amount determined to be smaller than the actual use amount.

When the target use amount is determined, the use amount of the I/O thread i for the resource (e.g. central processing unit) can be modified based on the target use amount (415). For example, the resource allocated to the selected I/O thread i can be increased or decreased. In this case, the allocation of the resource for the I/O thread can be controlled by using a resource management interface separately installed in the kernel, etc.

Depending on the embodiment, it can be determined whether or not to sequentially control an I/O thread other than the selected I/O thread i or whether or not to further control the selected I/O thread i (417). If it is determined that further control is to be performed (YES at 417), then a particular I/O thread (i+k) (k≥0) can be selected, and the procedures 401 to 417 described above can be repeated. Here, k can be 1 or can be a natural number other than 1. In other words, it is possible to have all of the multiple number of I/O threads (i+k) (k≥0) selected sequentially in a predefined order or an arbitrary order, or it is possible to have only a portion of the multiple I/O threads (i+k) (k≥0) (e.g.

I/O threads (i+2) where i=1, 3, 5) selected. Depending on the embodiment, it is also possible to have the same I/O thread i (k=0) selected again.

A performance control method according to the embodiment described above can be implemented in the form of a program that may be executed by a computer apparatus. Here, the program can include program instructions, data files, data structures, etc., alone or in combination. The program can be designed and produced by using machine code or high-level language code. The program can be designed specifically to implement the performance control method for a virtualized environment described above and can also be implemented by using various functions and definitions known and available to the skilled person in the field of computer software. Also, the computer apparatus can be implemented to include a processor, a memory, etc., that enables the functions of the program and can also further include communication devices as necessary.

The program for implementing the performance control method described above can be recorded onto a computer-readable recorded medium. The computer-readable recorded medium can include various types of hardware devices that are capable of storing specific programs that are executed according to a call by a computer, etc., where examples of such hardware devices may include magnetic disk storage media such as hard disks and floppy disks, optical recorded media such as compact disks and DVD's, magneto-optical recorded media such as floptical disks, and semiconductor storage devices such as ROM, RAM, flash memory, etc.

The foregoing provides a description of a method for controlling performance in a virtualized environment and an information processing device according to an embodiment of the invention. However, the method for controlling performance in a virtualized environment and the information processing device are not limited to the embodiment described above. Any device or method implemented by a person having ordinary skill in the art based on a variation or modification of the embodiment described above would also be an example of the method for controlling performance in a virtualized environment and information processing device set forth above. For example, an implementation in which the techniques described above are performed in an order different from the disclosed method, an implementation in which the elements described above, such as a system, structure, device, circuit, etc., are joined or combined in a form different from the disclosed method, an implementation in which the elements described above, such as a system, structure, device, circuit, etc., have other elements added thereto, and/or an implementation in which the elements described above, such as a system, structure, device, circuit, etc., are replaced or substituted by other elements can also be an embodiment of the method for controlling performance in a virtualized environment and information processing device set forth above.

What is claimed is:

1. An information processing device comprising:
one or more processors; and
one or more memories storing instructions, which when executed by the one or more processors, configure the one or more processors to:
implement an I/O thread configured to transfer signals between a virtual machine and at least one physical resource;
compare a target performance for the virtual machine with an actual performance of the virtual machine; and
manage a physical resource allocated to the I/O thread based on a comparison result of the comparing,
wherein the comparing includes:
an obtainment of information regarding the actual performance of the virtual machine; and
a determination of a performance adjustment value by using a difference between the actual performance of the virtual machine and the target performance for the virtual machine, and
wherein the management of the physical resource allocated to the I/O thread is based on the performance adjustment value.

2. The information processing device of claim 1, wherein the one or more processors are further configured to:
determine a target use amount for a first processor, of the one or more processors or another processor, of the I/O thread in correspondence to the performance adjustment value; and
manage a resource of the first processor allocated to the I/O thread based on the target use amount of the first processor.

3. The information processing device of claim 2, wherein the one or more processors are further configured to generate a control signal for at least one of the I/O thread and the first processor based on the target use amount.

4. The information processing device of claim 2, wherein the one or more processors are further configured to:
compute the performance adjustment value based on a ratio of the target performance with respect to the difference between the actual performance and the target performance; and
determine the target use amount by adding or subtracting the performance adjustment value respectively to or from a current use amount for the first processor.

5. The information processing device of claim 4, wherein the one or more processors are further configured to compute the performance adjustment value by further using an adjustment constant.

6. The information processing device of claim 1, wherein the at least one physical resource includes at least one of a network device and a memory device.

7. The information processing device of claim 1, wherein the one or more processors are configured to receive input of the target performance for the virtual machine from a user or from a processor of the one or more processors or another processor.

8. The information processing device of claim 1, wherein the virtual machine is a kernel-based virtual machine.

9. A performance control method performed by an information processing device in a virtualized environment, the performance control method comprising:
obtaining a target performance for a virtual machine and an actual performance for the virtual machine;
determining a performance adjustment value by using a difference between the actual performance of virtual machine and the target performance for the virtual machine; and
managing a resource allocated to an I/O thread based on the performance adjustment value,
wherein the I/O thread performs a transfer of signals between the virtual machine and at least one physical resource.

10. The performance control method of claim 9, wherein the managing of the resource allocated to the I/O thread based on the target performance and the actual performance comprises obtaining information on the actual performance of the virtual machine.

11. The performance control method of claim 10, wherein the managing of the resource allocated to the I/O thread based on the performance adjustment value comprises:

determining a target use amount for a processor of the I/O thread in correspondence to the performance adjustment value; and managing a resource of the processor allocated to the I/O thread based on the target use amount for the processor.

12. The performance control method of claim 11, wherein the managing of the resource allocated to the I/O thread based on the performance adjustment value comprises:

generating a control signal for at least one of the I/O thread and the processor based on the target use amount.

13. The performance control method of claim 11, wherein the determining of the performance adjustment value by using the difference between the actual performance of the virtual machine and the target performance for the virtual machine comprises computing the performance adjustment value based on a ratio of the target performance with respect to the difference between the actual performance and the target performance, and wherein the determining of the target use amount for the processor of the I/O thread in correspondence to the performance adjustment value comprises determining the target use amount by adding or subtracting the performance adjustment value to or from a current use amount for the processor.

14. The performance control method of claim 13, wherein the computing of the performance adjustment value further comprises computing the performance adjustment value by further using an adjustment constant.

15. The performance control method of claim 9, wherein the at least one physical resource comprises at least one of a network device and a memory device.

* * * * *